United States Patent
Birsching et al.

(10) Patent No.: US 10,421,485 B2
(45) Date of Patent: Sep. 24, 2019

(54) STEERING SYSTEM HAVING A PRESSURE SENSOR

(71) Applicant: STEERING SOLUTIONS IP HOLDING CORPORATION, Saginaw, MI (US)

(72) Inventors: Joel E. Birsching, Vassar, MI (US); Martin P. Sheridan, Midland, MI (US); John T. Sigelko, Midland, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 45 days.

(21) Appl. No.: 15/440,557

(22) Filed: Feb. 23, 2017

(65) Prior Publication Data
US 2017/0240202 A1 Aug. 24, 2017

Related U.S. Application Data

(60) Provisional application No. 62/299,171, filed on Feb. 24, 2016.

(51) Int. Cl.
| | |
|---|---|
| *B62D 5/06* | (2006.01) |
| *B62D 5/08* | (2006.01) |
| *B62D 5/22* | (2006.01) |
| *B62D 6/00* | (2006.01) |
| *B62D 5/04* | (2006.01) |
| *B62D 6/10* | (2006.01) |

(52) U.S. Cl.
CPC .......... *B62D 5/062* (2013.01); *B62D 5/0463* (2013.01); *B62D 5/06* (2013.01); *B62D 5/08* (2013.01); *B62D 5/22* (2013.01); *B62D 6/00* (2013.01); *B62D 6/003* (2013.01); *B62D 6/10* (2013.01)

(58) Field of Classification Search
CPC . B62D 5/062; B62D 5/08; B62D 5/22; B62D 6/00
USPC ................... 180/417, 422, 427, 428
See application file for complete search history.

(56) References Cited

U.S. PATENT DOCUMENTS 5,791,433 A * 8/1998 Murakami ............... B62D 6/02
180/417
6,547,030 B1* 4/2003 Nomura ................ F16K 31/047
180/441
(Continued)

FOREIGN PATENT DOCUMENTS

| CN | 201110370 Y | 9/2008 |
|---|---|---|
| CN | 103738395 A | 4/2014 |

(Continued)

OTHER PUBLICATIONS

English Translation of Chinese Office Action and Search Report for Chinese Application No. 201710276741.6 dated Sep. 30, 2018, 9 pages.

*Primary Examiner* — Jacob D Knutson

(57) ABSTRACT

A power steering system includes a steering column assembly, a steering gear assembly, and a pressure sensor, and a torque sensor. The steering column assembly has a steering shaft and the steering gear assembly is operatively connected to the steering shaft. The steering gear assembly has an input shaft that extends through a valve housing and extends into a rack housing. The pressure sensor is arranged to provide a pressure signal indicative of a fluid pressure of at least one of a first cavity and a second cavity disposed within the rack housing.

19 Claims, 3 Drawing Sheets

(56) References Cited

U.S. PATENT DOCUMENTS

| | | | | |
|---|---|---|---|---|
| 6,817,437 | B2* | 11/2004 | Magnus | B62D 5/006 |
| | | | | 180/403 |
| 7,642,738 | B2* | 1/2010 | Hamada | B62D 5/0496 |
| | | | | 318/432 |
| 7,798,282 | B2 | 9/2010 | Crossman | |
| 2006/0249326 | A1* | 11/2006 | Birsching | B62D 5/0835 |
| | | | | 180/422 |
| 2011/0046852 | A1* | 2/2011 | Yamamoto | B62D 5/065 |
| | | | | 701/41 |
| 2013/0048410 | A1* | 2/2013 | Ishikawa | B62D 5/061 |
| | | | | 180/441 |
| 2014/0345965 | A1* | 11/2014 | Ura | B62D 5/0835 |
| | | | | 180/404 |
| 2017/0144700 | A1* | 5/2017 | Nhila | B62D 5/065 |

FOREIGN PATENT DOCUMENTS

| | | | |
|---|---|---|---|
| CN | 203974923 U | 12/2014 | |
| FR | 2874573 A1 * | 3/2006 | B62D 5/083 |

* cited by examiner

STEERING SYSTEM HAVING A PRESSURE SENSOR

CROSS-REFERENCES TO RELATED APPLICATIONS

This patent application claims priority to U.S. Provisional Patent Application Ser. No. 62/299,171, filed Feb. 24, 2016 which is incorporated herein by reference in its entirety.

BACKGROUND

The present disclosure relates to a steering system having a pressure sensor.

Hydraulic power steering systems use a power steering pump to provide pressurized hydraulic fluid to a steering gear. The level of assist provided by the hydraulic power steering system is determined by the amount of torque applied by the driver to a steering valve integrated into the steering gear.

SUMMARY

According to an embodiment of the present disclosure, a power steering system is provided. The power steering system includes a steering column assembly, a steering gear assembly, and a pressure sensor. The steering column assembly has a steering shaft. The steering gear assembly has a rack housing and a valve housing. The rack housing receives a portion of a steering rack assembly. The portion of the steering rack assembly and the rack housing define a first cavity and a second cavity. The valve housing is operatively connected to the rack housing. The valve housing receives a valve assembly and an input shaft that extends through the valve assembly and is operatively connected to the steering rack assembly and the steering shaft. The pressure sensor arranged to provide a pressure signal indicative of at least one of a first cavity pressure and a second cavity pressure.

According to another embodiment of the present disclosure, a power steering system is provided. The power steering system includes a steering column assembly, a steering gear assembly, a pressure sensor, and a torque sensor. The steering column assembly has a steering shaft. The steering gear assembly is operatively connected to the steering shaft. The steering gear assembly has an input shaft that extends through a valve housing and extends into a rack housing that is connected to the valve housing. The rack housing defines a first cavity and a second cavity. The pressure sensor is arranged to provide a pressure signal indicative of a fluid pressure of at least one of the first cavity and the second cavity. The torque sensor is arranged to provide a torque signal indicative of a steering torque applied to the steering shaft.

According to yet another embodiment of the present disclosure, a power steering system is provided. The power steering system includes a steering gear assembly and steering assist assembly. The steering gear assembly is operatively connected to a steering shaft and includes a rack, a valve body, and an input shaft. The rack is disposed within a rack housing. The rack end the rack housing defines a first cavity and a second cavity. The valve body is disposed within a valve housing that is operatively connected to the rack housing. The valve body defines a first annular groove that is fluidly connected to the first cavity and a second annular groove that is fluidly connected to the second cavity. The input shaft extends through the valve body and is operatively connected to a rotary member that extends into the rack. The steering assist assembly has an electric actuator that is operatively connected to the steering shaft and the input shaft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
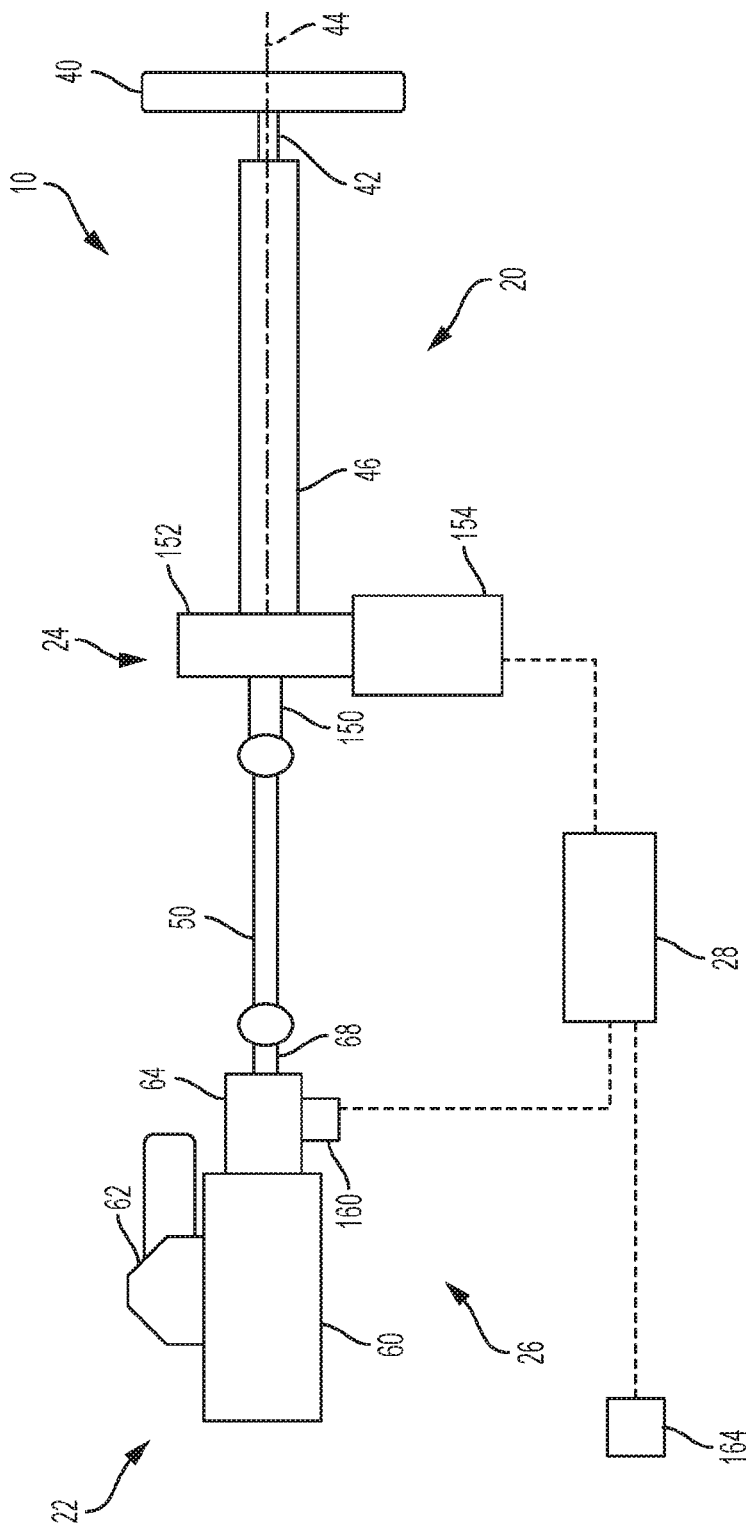
FIG. 1 is a perspective view of a power steering system having a pressure sensor.
Figure 2:
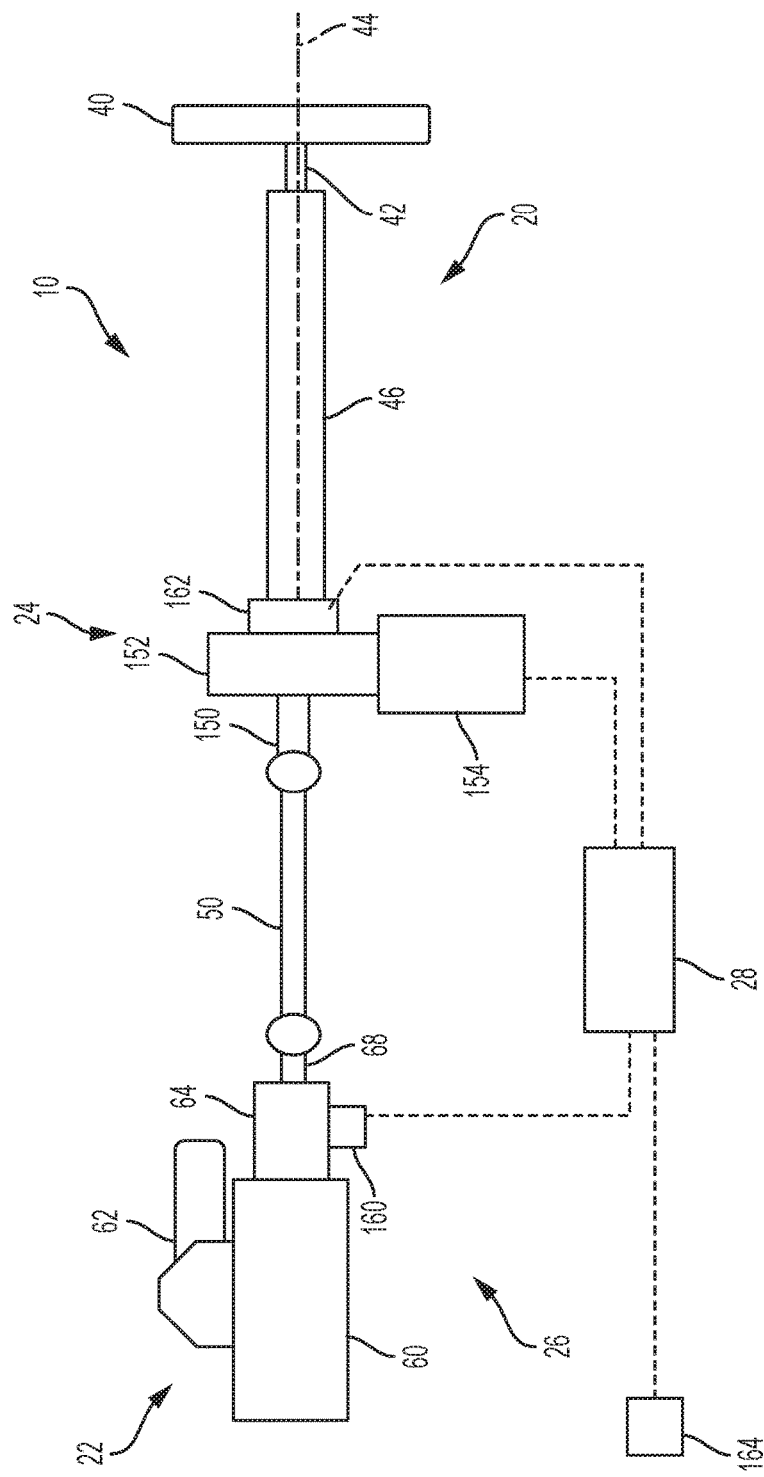
FIG. 2 is a perspective view of a power steering system having a pressure sensor and a torque sensor.

Referring to FIGS. 1 and 2, a power steering system 10 is shown. The power steering system 10 may be configured as a hydraulic power steering system having an electric power steering assist system. The electric power steering assist system in conjunction with the hydraulic power steering system provides the ability to implement advanced features such as active damping, active returnability, pull compensation, lane keeping, steering feedback, and park assist. These advanced features and standard operating of the power steering system 10 may require coordination between the hydraulic power steering system and the electric power steering assist system.

The power steering system 10 includes a steering column assembly 20, a steering gear assembly 22, a steering assist assembly 24, a sensor assembly 26, and a controller 28.

The steering column assembly 20 includes a steering wheel 40 operatively connected to a steering shaft 42. The steering shaft 42 extends along a steering column axis 44 through a steering column 46.

The steering gear assembly 22 is operatively connected to the steering shaft 42 through an intermediate shaft 50. The steering gear assembly 22 is a hydraulic mechanism that is operatively connected to a hydraulic power steering pump that is configured to provide pressurized hydraulic fluid to the steering gear assembly 22. The amount of pressurized hydraulic fluid varies the level of assist provided by the steering gear assembly 22 at least partially determined by the amount of torque applied by a driver of a vehicle to the steering shaft 42; and in the embodiment shown, the torque applied to the steering shaft 42 through the steering wheel 40.

Figure 3:
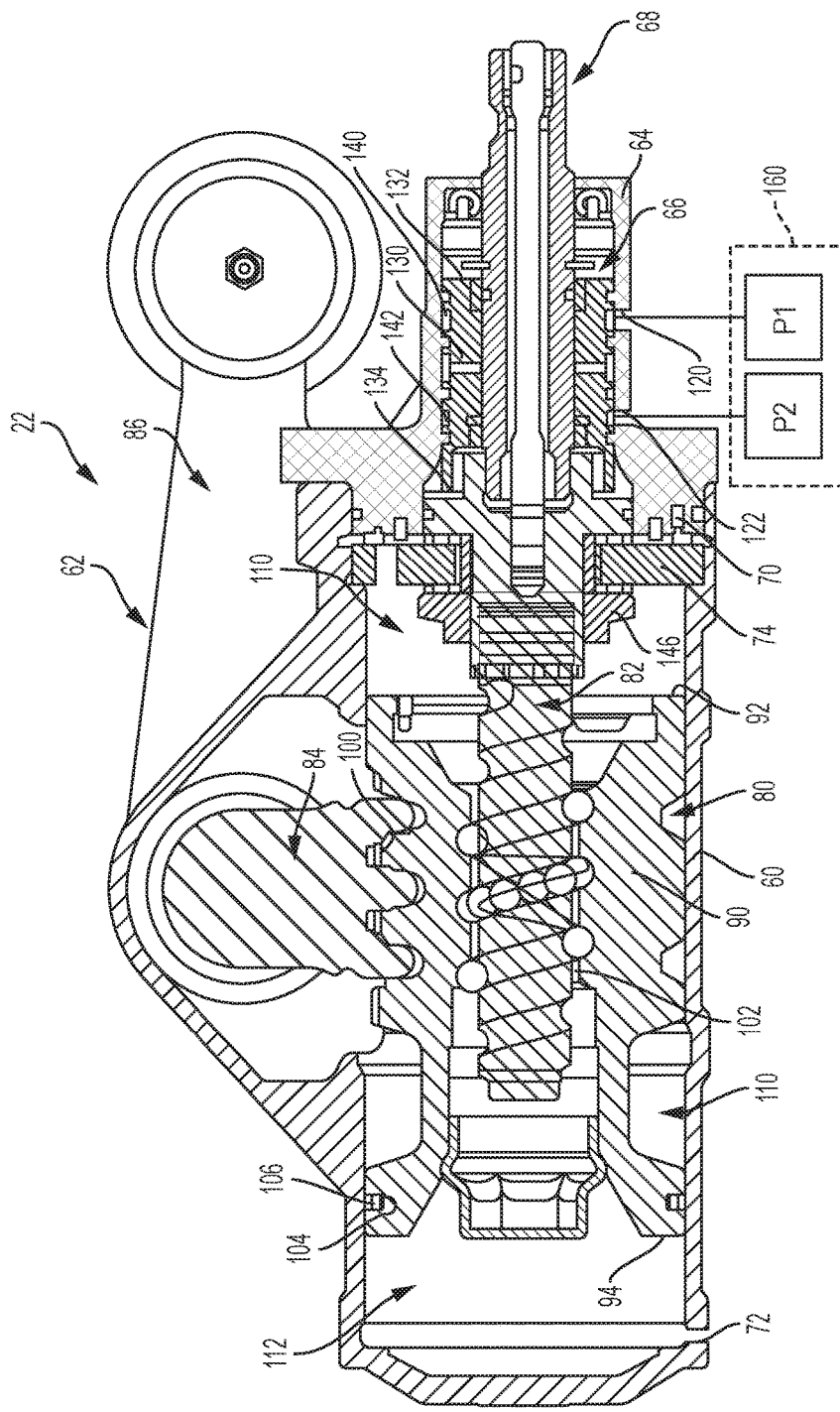
FIG. 3 is a cross-sectional view of a steering gear assembly of the power steering system of FIGS. 1 and 2.

Referring to FIGS. 1-3, the steering gear assembly 22 includes a rack housing 60, a steering rack assembly 62, a valve housing 64, a valve assembly 66, and an input shaft 68.

Referring to FIG. 3, the rack housing 60 extends from the valve housing 64. In at least one embodiment, the rack housing 60 defines a first port 70 and a second port 72. In at least one embodiment, the valve housing 64 defines the first port 70 and the rack housing defines the second port 72. The first port 70 extends through an opening formed in a bulkhead 74 that is disposed between the valve housing 64 and the steering rack assembly 62. The bulkhead 74 extends into the rack housing 60.

The rack housing 60 is configured to receive at least a portion of the steering rack assembly 62. The steering rack assembly 62 includes a rack 80, a rotary member 82, a Pitman shaft 84, and a Pitman arm 86.

The rack 80 is disposed within the rack housing 60. The rack 80 includes a rack body 90 that extends between a first rack end 92 and the second rack end 94. The first rack end 92 is disposed proximate and faces towards the valve assembly 66. The second rack end 94 is disposed opposite the first rack end 92 and faces towards an end of the rack housing 60.

The rack body 90 defines a plurality or of teeth or protrusions 100 that extend towards an interior surface of the rack housing 60. The rack body 90 defines a rack bore 102 that extends from the first rack end 92 to the second rack end 94. The rack bore 102 defines a helical ball groove.

The rack body 90 further defines a rack groove 104 that extends about a periphery of the rack body 90 proximate the second rack end. A rack ring 106 is received within the rack groove 104.

The rack housing 60 and the rack 80 define a first cavity 110 and a second cavity 112. The first cavity 110 is disposed proximate the first rack end 92, the rack housing 60, and at least a portion of the valve assembly 66. In at least one embodiment, the first cavity 110 is disposed between the rack ring 106 and the second rack end 94 of the rack body 90. The first port 70 is defined proximate and is fluidly connected to the first cavity 110. The second cavity 112 is defined proximate the rack ring 106 and the end of the rack housing 60. The second port 72 is defined proximate and is fluidly connected to the second cavity 112.

The rotary member 82 extends into the rack bore 102 of the rack body 90 of the rack 80 and extends into the valve housing 64. The rotary member 82 is attached to the input shaft 68. The rotary member 82 provides a thrust force on the rack 80 to translate the rack 80 along or relative to the rotary member 82. The rotary member 82 may be configured as a worm.

As the rotary member 82 is rotated, the valve assembly 66 provides assist pressure to either the first cavity 110 or the second cavity 112 depending on the direction of the torque to assist in steering the vehicle. For example, should the assist pressure be provided to the first cavity 110, the rack 80 moves towards the end of the rack housing 60. Should the assist pressure be provided to the second cavity 112, the rack 80 moves towards the valve assembly 66. The teeth or protrusions 100 of the rack body 90 of the rack 80 mate or engage with teeth of the Pitman shaft 84. As the rack 80 translates along or relative to the rotary member 82, the Pitman shaft 84 rotates along or about its axis. The Pitman shaft 84 is operatively connected to the Pitman arm 86 that is connected to a steering linkage of the vehicle. As the Pitman arm 86 rotates, the Pitman arm 86 swings or moves along an arc to move the steering linkage of the vehicle resulting in angulation of a steerable wheel of the vehicle to steer the vehicle.

The valve housing 64 is operatively connected to the rack housing 60. In at least one embodiment, the valve housing 64 defines a first port 120 and a second port 122. The valve housing 64 receives the valve assembly 66 and the input shaft 68.

The valve assembly 66 includes a valve body 130 that extends between a first valve body end 132 and a second valve body end 134. The second valve body end 134 is disposed opposite the first valve body end 132 and faces towards the steering rack assembly 62. The valve body 130 is disposed within the valve housing 64 and is disposed about the input shaft 68.

The valve body 130 defines a first annular groove 140 and the second annular groove 142. The first annular groove 140 is fluidly connected to the first cavity 110. The first port 120 is disposed proximate and is fluidly connected to the first annular groove 140. The second annular groove 142 is fluidly connected to the second cavity 112. The second port 122 is disposed proximate and is fluidly connected to the second annular groove 142. Each of the first annular groove 140 and the second annular groove 142 are disposed between the valve housing 64 and the valve body 130.

Referring to FIGS. 1-3, the input shaft 68 extends at least partially through the valve housing 64 and the valve assembly 66. At least a portion of the input shaft 68 is operatively connected to a portion of the rotary member 82 that extends into the valve housing 64 and also into the rack 80 through a coupling member 146, such as a spanner nut. A portion of the input shaft 68 extends from the valve housing 64 towards the steering shaft 42. The input shaft 68 is operatively connected to the steering shaft 42 via the intermediate shaft 50. The input shaft 68 includes a torsion bar that transmits torque between the input shaft 68 and the rotary member 82. The torsion bar enables the input shaft 58 to rotate relative to the rotary member 82.

Referring to FIGS. 1 and 2, the steering assist assembly 24 is disposed between the steering column assembly 20 and the steering gear assembly 22. The steering assist assembly 24 is operatively connected to the steering column assembly 20 via the steering shaft 42 and is operatively connected to the steering gear assembly 22 via the intermediate shaft 50 and the input shaft 68. In at least one embodiment, the steering assist assembly 24 is directly connected to the steering shaft 42 and the input shaft 68.

The steering assist assembly 24 is configured as an electric assist mechanism that provides torque overlay to aid a driver in steering the vehicle and providing feedback torque to improve feel for a driver of the vehicle. The steering assist assembly 24 applies a torque to the steering shaft 42 to affect the torque that an operator of the vehicle feels through the steering wheel 40. The torque may be a reaction torque applied through an assist mechanism. The steering assist assembly 24 may be directly connected to the steering column 46. In at least one embodiment, the steering assist assembly 24 may be directly connected to the steering gear assembly 22. The steering assist assembly 24 includes an output shaft 150, an assist mechanism 152, and an electric actuator 154.

The output shaft 150 extends from the assist mechanism 152 and is operatively connected to the steering shaft 42, the intermediate shaft 50, and/or the input shaft 68.

The assist mechanism 152 is configured to provide an assist torque or an assist force from the electric actuator 154 to the steering shaft 42, the intermediate shaft 50, and/or the input shaft 68. The assist mechanism 152 may be configured as a worm and a worm gear, a belt driven mechanism, a concentric motor, or any other suitable method connected to the electric actuator 154.

The electric actuator 154 provides a supplemental torque or an assist torque to a torque provided by at least one of the driver to the steering shaft 42 and the steering gear assembly 22 to assist in performing steering maneuvers and/or maneuvers of the advanced features of the power steering system 10.

The sensor assembly 26 includes a pressure sensor assembly 160, a torque sensor 162, and a vehicle sensor 164.

Referring to FIGS. 1-3, the pressure sensor assembly 160 is operatively connected to the steering gear assembly 22. The pressure sensor assembly 160 is arranged to provide a pressure signal indicative of a fluid pressure of the first cavity 110 and the second cavity 112. The first cavity pressure and the second cavity pressure are provided to the controller 28.

The pressure sensor assembly 160 may be operatively connected to the first port 70 and the second port 72 defined by the rack housing 60. The pressure sensor assembly 160 may be operatively connected to the first port 120 and the second port 122 defined by the valve housing 64, as shown in FIG. 3.

The pressure sensor assembly 160 is configured as a pressure sensor capable of measuring a differential pressure between the first cavity 110 and the second cavity 112. The pressure sensor assembly 160 may be a differential pressure sensor or a dual channel pressure sensor that may be used to monitor or measure a pressure difference between the first cavity 110 and the second cavity 112. The two channels may be integrated into a single sensor or may be two individual pressure sensors in communication with the controller 28.

The pressure sensor assembly 160 may be used by the controller 28 to determine an open loop torque command that is provided to the steering assist assembly 24 for common assist conditions such as variable effort. Variable effort is based on the pressure signal provided by the pressure sensor assembly 160, a torque applied to the steering wheel 40 and/or the steering shaft 42 by the operator of the vehicle, and the vehicle signal provided by the vehicle sensor 164.

Referring to FIGS. 2 and 3, the torque sensor 162 is arranged to provide a torque signal indicative of a steering torque imparted to or applied to at least one of the steering wheel 40 and the steering shaft 42 to the controller 28. The torque sensor 162 is disposed proximate the assist mechanism 152 and is disposed about the steering shaft 42 and/or the steering column 46. The torque sensor 162 may be used in conjunction with the pressure sensor assembly 160 or individually by the controller 28 to determine supplemental torque overlay commands such as leads and pulls corrections. In at least one embodiment, the pressure sensor assembly 160 and the torque sensor 162 may be used by the controller 28 to provide closed loop control of the assist level provided by the steering assist assembly 24 based on torque.

Referring to FIGS. 1 and 2, the vehicle sensor 164 is arranged to provide at least one vehicle signal indicative of an operational parameter of the vehicle to the controller 28. The operational parameter may be a vehicle speed, a steering angle, a steering effort, a brake torque, or the like.

The controller 28 may be a standalone component or may be provided as part of the electric actuator 154 of the steering assist assembly 24. In at least one embodiment, the controller 28 is provided as part of an overall control system or vehicle monitoring system.

The controller 28 is in communication with the pressure sensor assembly 160 and at least one of the torque sensor 162 and the vehicle sensor 164. The controller 28 is provided within input communication channels configured to receive the pressure signal, the torque signal, and the vehicle signal. The controller 28 is provided with output communication channels configured to provide a command, signal, or message to the electric actuator 154.

The controller 28 is provided with control logic executed by at least one processor such that the controller 28 is programmed to operate the electric actuator 154 to provide or apply a feedback torque or an assist torque to at least one of the steering shaft 42 and the input shaft 68. The feedback torque or the assist torque provided or applied by the electric actuator 154 is based on the differential pressure measured by the pressure sensor assembly 160 and at least one of the input torque measured by the torque sensor 162 and the operational parameter of the vehicle measured by the vehicle sensor 164.

In at least one embodiment, the controller 28 provides a torque overlay command to the electric actuator 154 that includes the amount of assist torque provided by the electric actuator 154 to at least one of the steering shaft 42 and the input shaft 68.

The controller 28 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 28 in controlling or working in concert with the electric actuator 154 of the steering assist assembly 24, the steering column assembly 20, the steering gear assembly 22, and the sensor assembly 26.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

The invention claimed is:

1. A power steering system, comprising:
   a steering column assembly having a steering shaft;
   a steering gear assembly having:
      a rack housing that receives a portion of a steering rack assembly, the portion of the steering rack assembly and the rack housing defining a first cavity and a second cavity, and
      a valve housing operatively connected to the rack housing, the valve housing receives a valve assembly fluidly connected to the rack housing and an input shaft that extends through the valve assembly and is operatively connected to the steering rack assembly and the steering shaft; and
   a pressure sensor arranged to provide a pressure signal indicative of at least one of a first cavity pressure and a second cavity pressure, the valve assembly including a valve body disposed about the input shaft, the valve body defining a first annular groove and a second annular groove, each groove being disposed between the valve housing and the valve body, and the first annular groove being fluidly connected to the first cavity and the second annular groove being fluidly connected to the second cavity.

2. The power steering system of claim 1, wherein the pressure sensor is a dual channel pressure sensor.

3. The power steering system of claim 1, further comprising a steering assist assembly having an electric actuator operatively connected to at least one of the steering shaft and the input shaft.

4. The power steering system of claim 3, further comprising a controller in communication with the pressure sensor and the electric actuator.

5. The power steering system of claim 4, wherein the controller is programmed to operate the electric actuator to apply an assist torque to at least one of the steering shaft and the input shaft based on the pressure signal.

6. A power steering system, comprising:
   a steering column assembly having a steering shaft;
   a steering gear assembly operatively connected to the steering shaft, the steering gear assembly having an input shaft that extends through a valve housing having a valve body disposed therein, the input shaft further extending into a rack housing that is connected to the valve housing, the rack housing defining a first cavity and a second cavity, the first cavity and the second cavity being fluidly connected to first and second annular grooves of the valve body;
   a pressure sensor arranged to provide a pressure signal indicative of a fluid pressure of at least one of the first cavity and the second cavity; and
   a torque sensor arranged to provide a torque signal indicative of a steering torque applied to the steering shaft.

7. The power steering system of claim 6, further comprising:
   a steering assist assembly disposed between the steering column assembly and the steering gear assembly, the steering assist assembly having an electric actuator operatively connected to the steering shaft and the input shaft.

8. The power steering system of claim 7, further comprising a controller in communication with the pressure sensor, the torque sensor, and the electric actuator.

9. The power steering system of claim 8, wherein the controller is programmed to, operate the electric actuator to apply an assist torque to at least one of the input shaft and the steering shaft based on the pressure signal and the torque signal.

10. A power steering system comprising:
    a steering gear assembly operatively connected to a steering shaft, the steering gear assembly having:
       a rack disposed within a rack housing, the rack and the rack housing defining a first cavity and a second cavity,
       a valve body disposed within a valve housing that is operatively connected to the rack housing, the valve body defining a first annular groove that is fluidly connected to the first cavity and a second annular groove that is fluidly connected to the second cavity, and
       an input shaft that extends through the valve body and is operatively connected to a rotary member that extends into the rack;
    a steering assist assembly having an electric actuator operatively connected to the steering shaft and the input shaft, wherein the valve housing defines a first port that is fluidly connected to the first annular groove and a second port that is fluidly connected to the second annular groove; and
    a pressure sensor assembly operatively connected to the first port and the second port and configured to provide a pressure signal indicative of a fluid pressure of the first cavity and the second cavity.

11. The power steering system of claim 10, further comprising a shaft that extends between the steering shaft and the input shaft to operatively connect the steering assist assembly and the steering gear assembly.

12. The power steering system of claim 10, further comprising:
    a torque sensor operatively connected to the steering shaft and arranged to provide a torque signal indicative of a steering torque of the steering shaft.

13. The power steering system of claim 12, further comprising:
    a vehicle sensor arranged to provide a vehicle signal indicative of an operational parameter of a vehicle.

14. The power steering system of claim 13, wherein the operational parameter is at least one of a vehicle speed, a steering angle, and a steering effort.

15. The power steering system of claim 13, further comprising a controller in communication with the pressure sensor assembly and at least one of the torque sensor and the vehicle sensor.

16. The power steering system of claim 15, wherein the controller is programmed to operate the electric actuator to apply an assist torque to at least one of the steering shaft and the input shaft based on the pressure signal and at least one of the torque signal and the vehicle signal.

17. A hydraulic steering gear assembly comprising:
    at least one housing;
    a rack body including and extending axially between a first rack end and a second rack end, the at least one housing and the first rack end defining at least in-part a first cavity, and the at least one housing and the second rack end defining at least in-part a second cavity;
    a rotary member engaged to the rack body and adapted to rotate about an axis to facilitate axial translation of the rack body;
    an input shaft attached to the rotary member; and
    a valve body fixed to and extending circumferentially about the input shaft and disposed radially between the input shaft and the at least one housing, and first and second annular grooves each defined by at least one of and disposed radially between the at least one housing and the valve body with the first and second annular grooves being in fluid communication with the respective first and second cavities for the flow of hydraulic fluid.

18. The hydraulic steering gear assembly set forth in claim 17, wherein the at least one housing includes a rack housing adapted to in-part define the first and second cavities, and a valve housing adapted to house the valve body.

19. The hydraulic steering gear assembly set forth in claim 18, wherein first and second ports are each defined by and communicate through the valve housing, and are in direct fluid communication with the respective first and second annular grooves to facilitate differential pressure measurement of the hydraulic fluid and between the first and second grooves.

\* \* \* \* \*